United States Patent [19]

Takayama et al.

[11] Patent Number: 5,717,918

[45] Date of Patent: Feb. 10, 1998

[54] METHOD FOR CONCURRENTLY PERFORMING A PHYSICAL SEQUENTIAL SCAN OF A DATABASE INTO A DATABASE BUFFER WHICH IS QUEUED UNTIL A PRECEDING SCAN IS COMPLETED

[75] Inventors: Hiroshi Takayama, Yokohama; Mitsuo Miyazaki, Zushi; Kazuo Masai, Yokohama; Kuniaki Yamashita, Kanagawa-ken, all of Japan

[73] Assignee: Hitachi, Ltd., Tokyo, Japan

[21] Appl. No.: 467,278

[22] Filed: Jun. 6, 1995

[30] Foreign Application Priority Data

Jun. 17, 1994 [JP] Japan .................................... 6-135464
Aug. 18, 1994 [JP] Japan .................................... 6-194252

[51] Int. Cl.⁶ ........................................................ G06F 17/30
[52] U.S. Cl. ............................. 395/608; 395/618; 395/620
[58] Field of Search ...................................... 395/425, 600, 395/250, 872, 650, 312, 492, 608, 618, 620; 364/200

[56] References Cited

U.S. PATENT DOCUMENTS

| | | | |
|---|---|---|---|
| 4,890,226 | 12/1989 | Itoh | 364/200 |
| 5,187,778 | 2/1993 | Yamamoto et al. | 395/250 |
| 5,239,644 | 8/1993 | Seki et al. | 395/425 |
| 5,274,809 | 12/1993 | Iwasaki et al. | 395/674 |
| 5,313,602 | 5/1994 | Nakamura | 395/425 |
| 5,321,832 | 6/1994 | Tanaka et al. | 395/620 |
| 5,333,314 | 7/1994 | Masai et al. | 395/618 |
| 5,349,656 | 9/1994 | Kaneko et al. | 395/650 |
| 5,379,424 | 1/1995 | Morimoto et al. | 395/600 |
| 5,412,806 | 5/1995 | Du et al. | 395/600 |
| 5,442,765 | 8/1995 | Shiga | 395/600 |
| 5,465,352 | 11/1995 | Nakazawa et al. | 395/600 |
| 5,485,610 | 1/1996 | Gioielli et al. | 395/600 |
| 5,497,467 | 3/1996 | Wakui et al. | 395/312 |
| 5,507,005 | 4/1996 | Kojima et al. | 395/872 |
| 5,537,552 | 7/1996 | Ogasawara et al. | 395/250 |
| 5,539,897 | 7/1996 | Samantha et al. | 395/492 |

OTHER PUBLICATIONS

"An Introduction to Database Systems", C.J. Date, Addison–Wesley, 1986, pp. 110–111, pp. 333–350.

"DB2 Design & Development Guide", C.J. Date, Addison–Wesley, 1988, pp. 214–220.

Montgomery, Stephen L. "Follow these 13 Rules to Make DB2 Run Faster", Software Magazine, v10, n6, p.64(9), Apr. 1990.

Silberschatz, Avi "Database Systems: Achievements and Opportunities. (One of Six Articles on Next-generation data Base Management Systems)", Communications of the ACM, v34, n10, p110(11), Oct. 1991.

Primary Examiner—Thomas G. Black
Assistant Examiner—Charles L. Rones
Attorney, Agent, or Firm—Fay, Sharpe, Beall, Fagan, Minnich & McKee

[57] ABSTRACT

A database system is provided for reading data from a database to a database buffer and performing a physical sequential scan for the data on the buffer. If the preceding request for physical sequential scan is under execution, the database system operates to keep the succeeding request for scan in a waiting state until the preceding requested scan is completed and then execute the succeeding request for scan after the preceding requested scan is completed. If there are more than one succeeding requests for physical sequential scan, they are executed at the same time. Another scanning method is also provided. If the preceding request for scan is under execution, the succeeding requested scan is executed for the data existing after the halfway location at which the preceding scan process now reads the data. The short data is read from its head for completing the subsequent scan.

14 Claims, 12 Drawing Sheets

FIG. 9
READING DATA INTO BUFFER
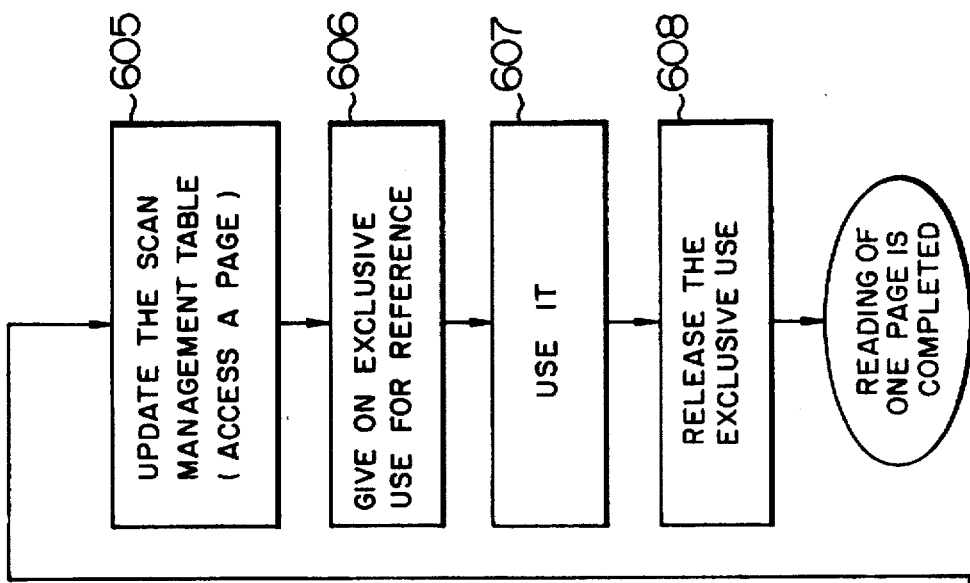
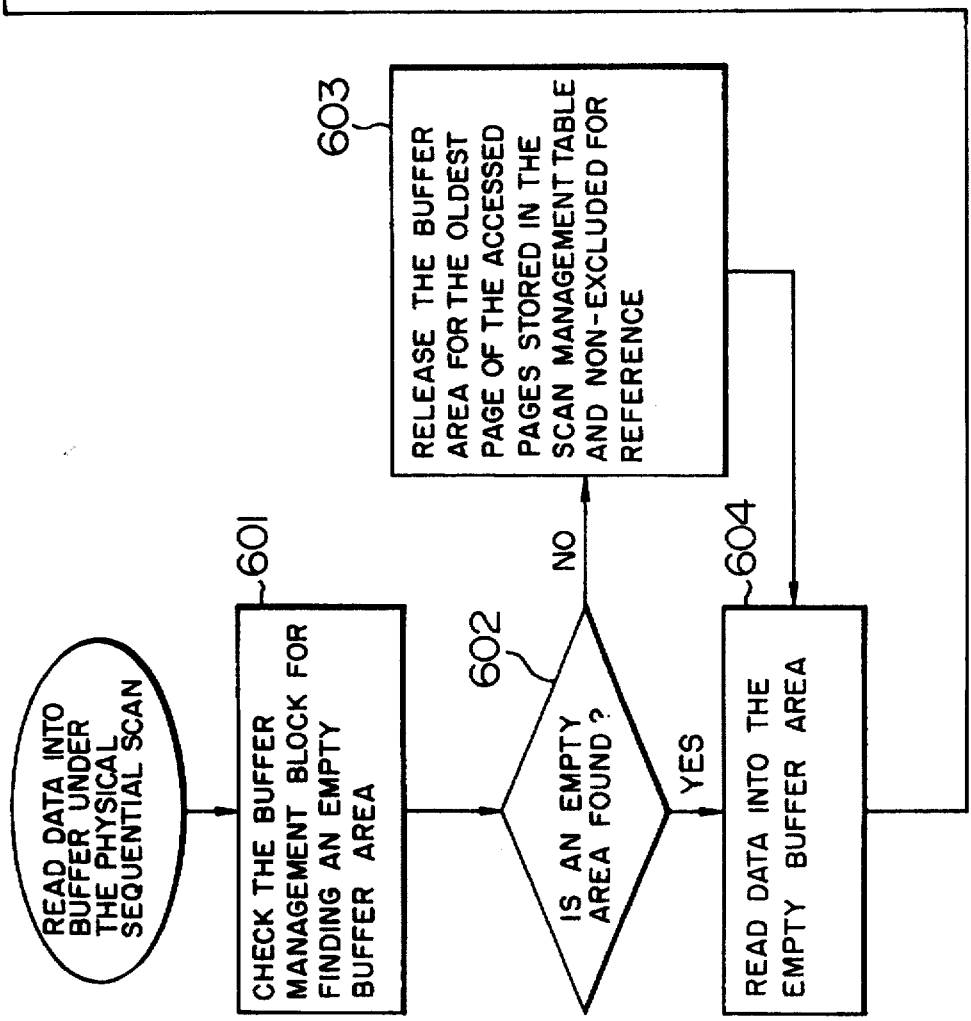

METHOD FOR CONCURRENTLY PERFORMING A PHYSICAL SEQUENTIAL SCAN OF A DATABASE INTO A DATABASE BUFFER WHICH IS QUEUED UNTIL A PRECEDING SCAN IS COMPLETED

BACKGROUND OF THE INVENTION

The present invention relates to a method for retrieving (scanning) all of the data items in a database provided in a database processing device for managing data in an external storage medium, and more particularly to method for retrieving data in a database arranged on external storage units without using any index.

The conventional database system has been arranged to optimize a request for scan (retrieval) input thereto before the request is executed. The basic flow of this process is discussed in detail in "An Introduction to Database Systems, C. J. Date, Addison-Wesley, 1986, pages 110 to 111, pages 333 to 350". As a widely available means of speeding up a database scan, it is possible to refer to a method for defining an index and using it for improving scanning efficiency. For an unfixed type service, however, no index may be provided in the scan condition. If any index is provided therein, a specific index may not be found in the condition. In this case, it is necessary to do a physical sequential scan for the database. To do the physical sequential scan, information recorded on a magnetic disk is broken into units and a predetermined group of units is moved to a buffer memory. This buffer memory uses a storage unit with a fast accessing capability such as a semiconductor memory. Then, by comparing each data unit on the buffer memory, all the data is scanned in the database.

When the physical sequential scan is started, the data in the external storage unit is read into a database buffer of a main storage in a sequence from the head to the end of the data. While a physical sequential scan for a database is in execution, another scan for the same database may take place. In this case, these scanning processes are executed in parallel. This is a so-called multitask process. Like the previous process, the data in the external storage unit is read into the database buffer of the main storage in a sequence from the head to the end. This parallel processing is effective as an allocating process, that is, a process for scanning a data unit and invoking it without changing the content of the database.

If the request for physical sequential scan takes place, an important factor is to read data from the external storage unit to the main storage as fast as possible. As a means of doing so, as discussed in "DB2 Design & Development Guide, C. J. Date, Addison-Wesley, 1988 pages 214 to 220", there have been proposed some methods such as a method for reading consecutive blocks at a time or a method for predicting a group of consecutive blocks and pre-reading (pre-inputting) some blocks. Further, Japanese Patent Laid-open Unexamined Publication No. 3-41550 has proposed a parallel distributed processing method for enhancing an overall retrieving performance, the method being arranged to divide a series of scanning processes into tuples and execute these tuples in parallel through the effect of plural processing devices for the purpose of reducing and unifying a load burdened on each processing device.

SUMMARY OF THE INVENTION

As a result of studying the conventional techniques, the inventors found out the following problems involved therein. In general, the buffer memory provides a smaller storage capacity than a storage capacity of an external storage unit for storing a database. In a case that a scanning process is executed in a database buffer, the processed data (say, the head data stored in the database buffer) is purged out of the database buffer. If another process for physical sequential scan takes place after the processed data is purged out, the data in the database buffer is not reused for the new process. Hence, the data is required to be read again from the external storage unit to the database buffer of the main storage in a sequence from the head to the end. This leads to a remarkable scanning efficiency. Moreover, the database buffer is divided for plural requests for scan. This means that each process has a small buffer size allocated thereto.

As mentioned above, the conventional method for reading data from an external storage unit does not provide any means of arranging times of entering data from the external storage unit among plural scanning processes and thereby reducing reading times. If plural requests for physical sequential scan for a database are given, a process for repetitively reading data from the external storage unit takes place in the main storage. As such, an access conflict with the database buffer of the main storage takes place among the requests for scan. This leads to remarkably lowering the scanning efficiency.

It is an object of the present invention to provide a method for concurrently executing a physical sequential scan in a database system arranged to do plural scans for one database which method is arranged to reduce the times of reading data from an external storage medium for plural requests for scanning the data in the database and efficiently scanning the data in the database.

It is a further object of the present invention to provide a method for concurrently doing a physical sequential scan for a database which method is arranged to improve utilization efficiency of a database buffer.

It is a yet further object of the present invention to provide a method for concurrently doing a physical sequential scan for a database which method is arranged to reduce the times of accessing a database built in an external storage unit.

It is another object of the present invention to provide a method for concurrently doing a physical sequential scan for a database which method is arranged to efficiently and rapidly reuse data read out of the database.

In carrying out the objects, in a database system for concurrently executing plural processes for scanning all the data items in one database, a scanning method according to the present invention is arranged so that if a preceding request for physical sequential scan is given before one or more requests for such scan, these plural requests are kept waiting until the preceding scan is completed and then started. If two or more requests for scan are kept waiting, these plural requests are executed at the same time. Concretely, when reading data from the database to the database buffer, these plural scanning processes are executed by using the read data. The succeeding plural processes for physical sequential scan can use one database buffer and execute the scanning processes as a batch, thereby reducing the times of reading data from the number of external storage medium.

Moreover, the present invention may adopt a further improved method. Concretely, if a preceding request for physical sequential scan is given before one or more requests for such a scan for a database, the succeeding scans are executed for the data existing after, the halfway point of the read data at a current point by the preceding scanning process. By this means, the scans to be executed after the halfway point may use one database buffer for executing the physical sequential scans as a batch, thereby reducing the number of times of reading data from the external storage medium. About the portion between the start and the halfway point of the database, that is, the portion unscanned by the succeeding scanning process, the corresponding data is read from the head to the halfway point and then is processed in the database buffer.

In addition to the above-mentioned method, the database system having plural processing devices for enabling parallel operations uses buffer areas included in these devices. For example, if the data read out to the buffer area of a device becomes unnecessary, the system operates to check if each buffer area of the other devices has any empty portion and transfer the data to the buffer area if an empty portion is found without discarding the unnecessary data. If the data is required to be used again, the data is transferred from the empty portion of the buffer area to the original buffer area or another processing device executes the scan for the reused data. This operation makes it possible to efficiently and rapidly reuse the data read out of the database.

BRIEF DESCRIPTION OF THE DRAWINGS

FIG. 9 is a flowchart showing a process of reading data into a database buffer;

DESCRIPTION OF THE PREFERRED EMBODIMENTS

Hereafter, an embodiment of the invention will be discussed in detail with reference to the drawings.

[Embodiment 1]

Figure 1:
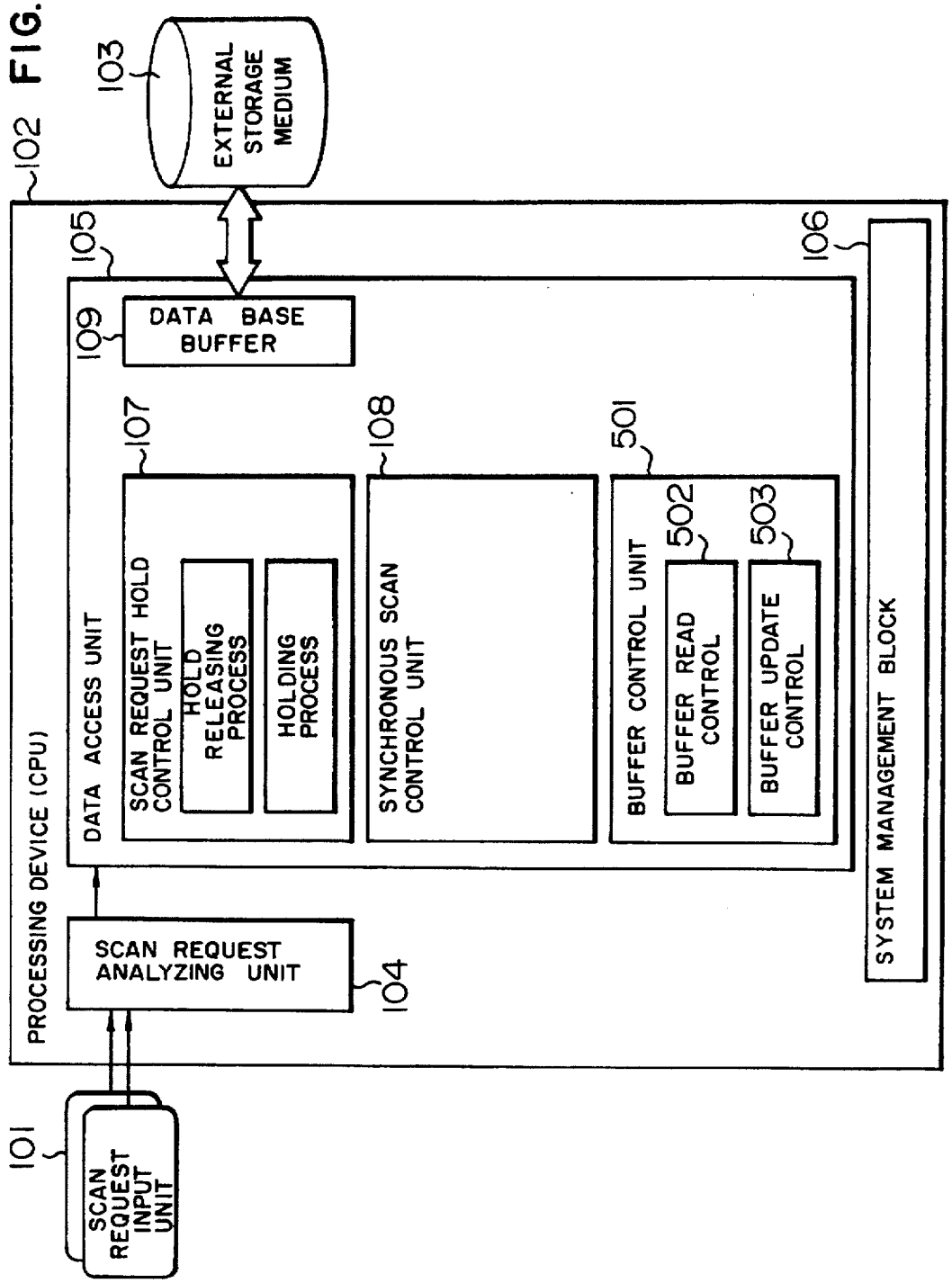
FIG. 1 is a block diagram showing an overall arrangement of an embodiment of a system for concurrently doing a physical sequential scan to which a method of the invention applies.

FIG. 1 is an overall block diagram showing an embodiment of a system for concurrently performing a physical sequential scan, the system embodying the present invention.

As shown in FIG. 1, the system for concurrently doing a physical sequential scan according to this embodiment is arranged to have a scan request input unit 101 for receiving a scan request given by a user, a processing device 102 composed of a CPU for executing a scanning process, and an external storage unit 103 for storing data to be scanned in a relational database format. The scan request input unit 101 is a terminal provided with a display unit and a keyboard, for example. As the unit 101, a workstation may be used. Plural units 101 may be provided in the system.

The processing device 102 operates to analyze a request for scan given by the scan request input unit 101 and scan data in the external storage unit 103. The processing device 102 includes a scan request analyzing unit 104 for determining if all the data is to be scanned, a database access unit 105 for controlling access to the external storage unit 103, and a system management block 106 for managing control information of the system.

The database access unit 105 is arranged to have a scan request hold control unit 107 for temporarily holding a current scan request if another scan request is now being executed for the overall data when the current scan request is started, a synchronous scan control unit 108 for controlling the scan synchronously with another scan process, a database buffer 109 having a predetermined storage capacitance for temporarily storing data read from the external storage unit 103, and a buffer control unit 501. The buffer control unit 501 provides a buffer read control block 502 and a buffer update control block 503. In FIG. 1, the system management block 106 and the database buffer 109 are described in respective blocks. They may use areas of a main storage unit (not shown) allocated thereto.

Figure 2:
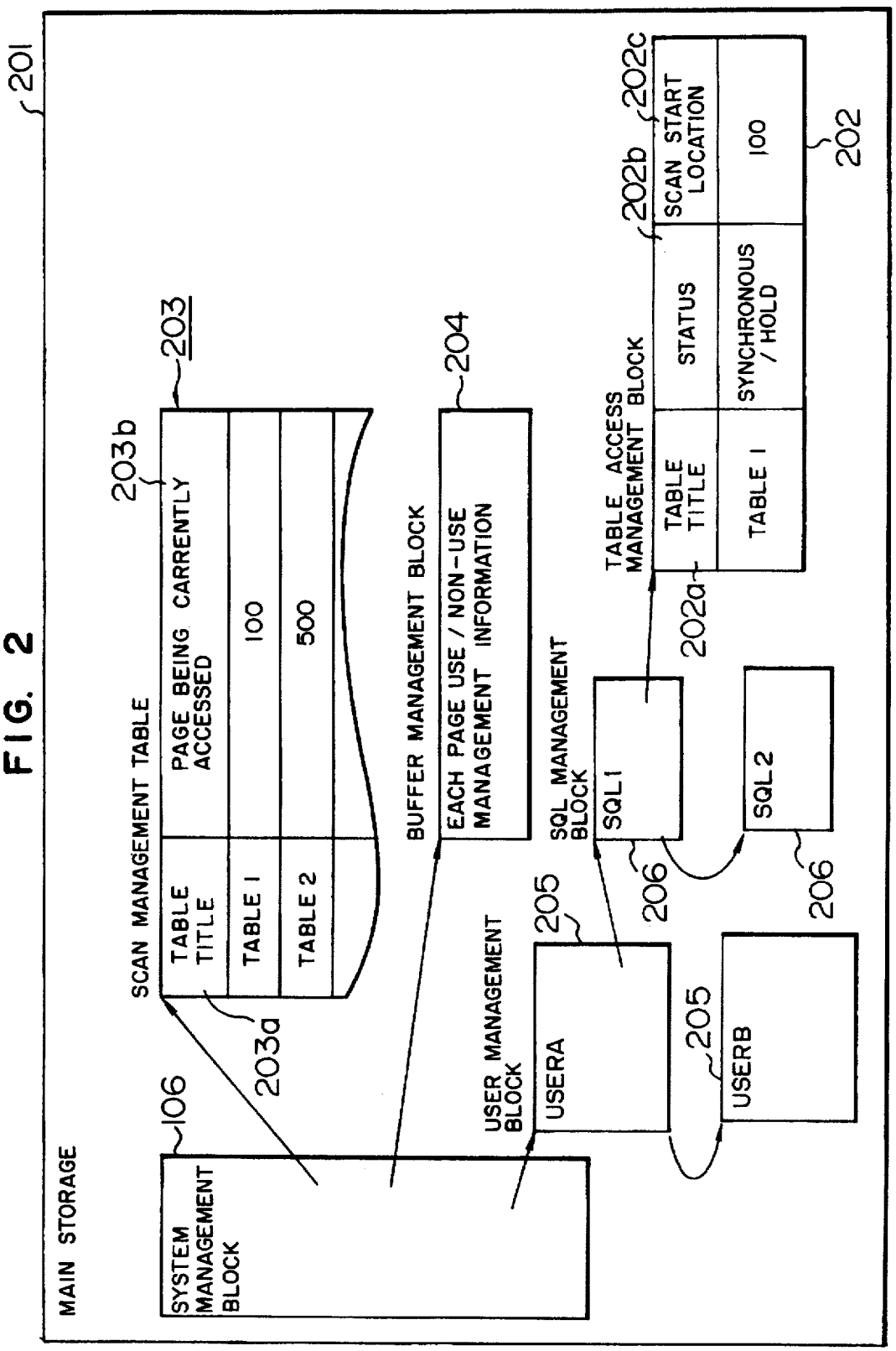
FIG. 2 is a diagram showing a system management block shown in FIG. 1.

FIG. 2 is a diagram showing a detailed arrangement of the system management block 106. The control information managed by the system management block 106 contains a user management block 205 for managing user information for each user, an SQL management block 206 for managing a scan request input by each user, that is, SQL (Structured Query Language) for each user, a table access management block 202 for storing a synchronous or holding status and a location (page) from which a scan is started for each table to be accessed within the SQL, a scan management table 203 for managing the table and the currently accessed page, and a buffer management block 204 for managing if each page of the database buffer 109 is used.

The request for the database input from the scan request input unit 101 is analyzed by the scan request analyzing unit 104 for determining the method for scanning the data in the database. For example, in a case that no index to be used for a scan is provided or a low hit rate is estimated from the statistics about the past scans if any index is provided, the analyzing unit 104 determines that a physical sequential scan is to be executed. If so, in response to the new scan request, the scan request hold control unit 107 operates to determine if the table to be accessed is now under the physical sequential scan by referring to the scan management table 203. If the physical sequential scan is executed for the table by another request, the control unit 107 operates to set a status information 202b of the table access management block 202 about the current new scan request to a "hold" state and keep the current new scan request in the waiting state. After the preceding physical sequential scan is completed, the "held" one or more scan requests are concurrently started. This function will be discussed below with reference to FIG. 3.

Next, another scanning method is explained. In response to the scan request given by a user and input from the scan request input unit 101, the synchronous scan control unit 108 operates to determine if the table to be currently accessed is now under the physical sequential scan by referring to the scan management table 203 and if the table is under the scan done by another request, sets a status information 202b of the table access management block 202 about the new scan request to a "synchronous" state, sets the current access page managed by the scan management table 203 to a scan start location information 202c of the table access management block 202 and starts the physical sequential scan from the halfway page.

Next, the operation of the system according to the invention will be discussed with reference to the flowcharts of FIGS. 3 to 5.

Figure 3:
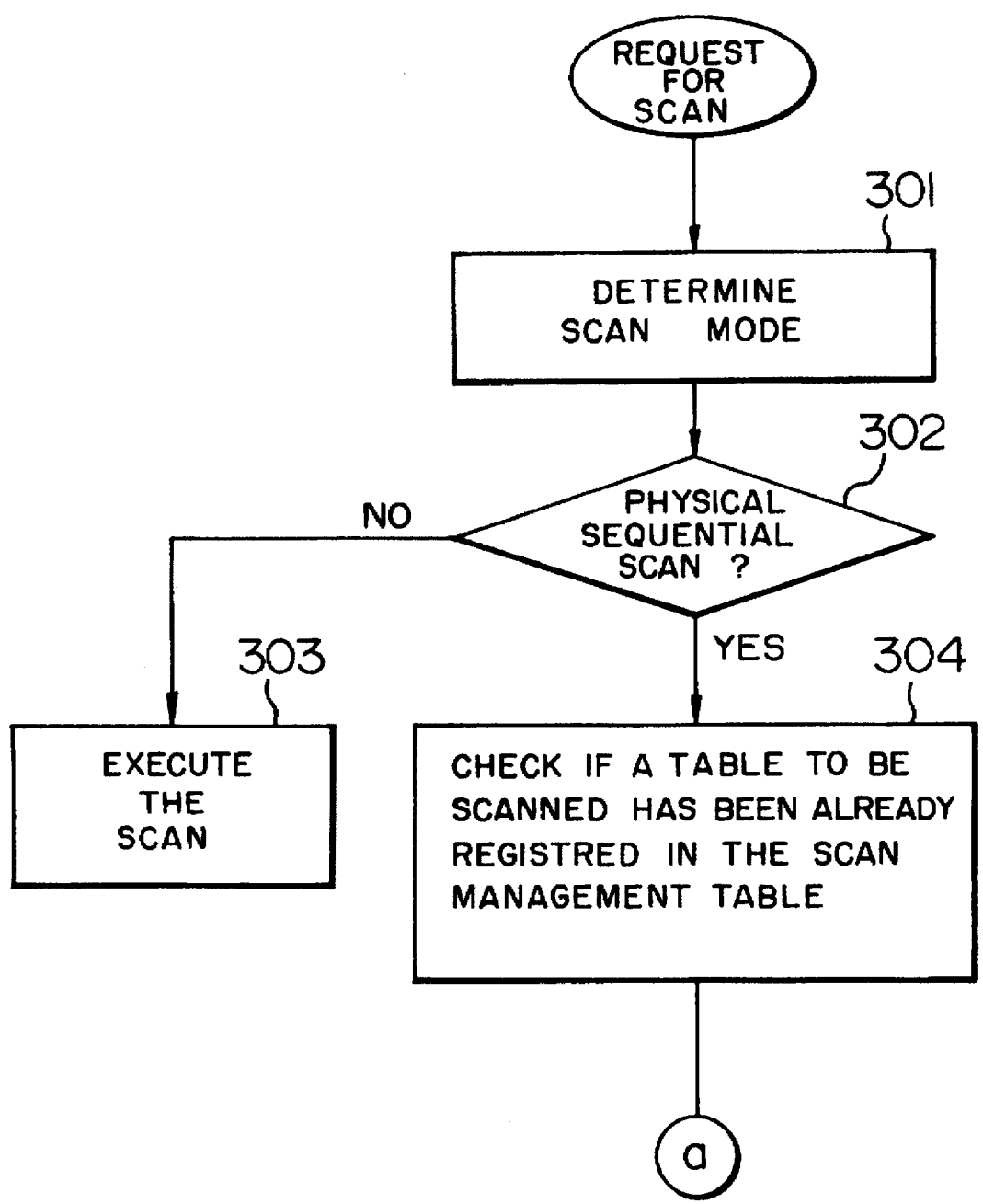
FIG. 3 is a flowchart showing the first half of executing a physical Sequential scan by temporarily holding plural physical sequential scans.
Figure 4:
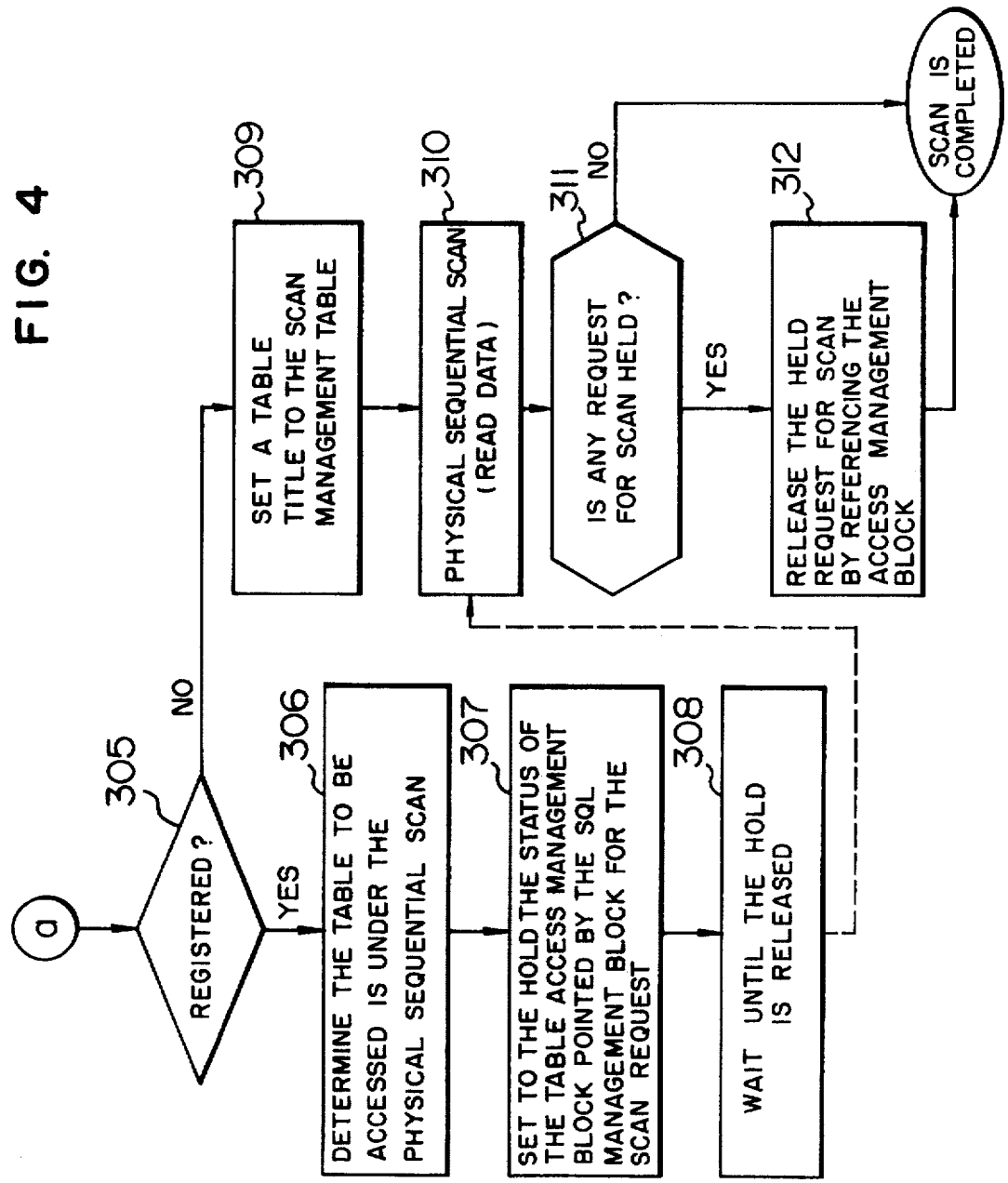
FIG. 4 is a flowchart showing the flow after that shown in FIG. 3, that is, the physical sequential scan by temporarily holding plural physical sequential scans.

FIG. 3 is a flowchart showing the operation of the system executed in a physical sequential scan hold manner.

At first, when a request for scan is input to the system, the operation is executed to determine a proper scan mode for the request, that is, whether or not the physical sequential scan is executed. This determination is based on whether or not any index exists for the requested scan or if it does, whether or not a hit rate is proper by referring to the statistics about the past scan processes. If the hit rate is too high, the index is not necessary to the scan (step 301)

If it is determined that the physical sequential scan is more effective, the operation is executed to check the scan management table 203 for obtaining information about whether or not a physical sequential scan is now in operation (steps 302 and 304). In other words, the information to be obtained is about whether or not the table to be retrieved by the current request for scan has been already registered in the scan management table 203 (step 305).

If the physical sequential scan over a target database (table) is now under execution by another request, the operation is executed to set the status information of the table access management block 202 for the current scan request to the hold state (steps 306 and 307) and make the scan being requested wait until the hold state is released (step 308).

if, on the other hand, the physical sequential scan is not in operation, the operation proceeds to register in the scan management table 203 a table title 203a to be scanned, to start the physical sequential scan, and to read the target data (steps 305, 309, 310).

When the scan is completed, the scan request hold control unit 107 operates to scan the table access management block 202 for checking for a "held" request for scan. If a request for scan is held, the control unit 107 operates to release the held request from the waiting state and indicates to start the requested scan. If two or more requests are released, these requests are concurrently executed. The detail of this operation will be discussed below with reference to FIGS. 8 and 9.

As set forth above, if the preceding request for the physical sequential scan is issued, the system keeps the succeeding requests for the scan waiting until the preceding requested scan is completed. After the preceding scan is completed, the succeeding plural requests are executed. As such, if these requests for the physical sequential scan reach the system at their respective times, those requests are started at a time when the preceding requested scan is completed. The succeeding requested scans are executed as a batch by using the database buffer 109. This operation makes a great contribution to enhancing the scanning efficiency.

Figure 5:
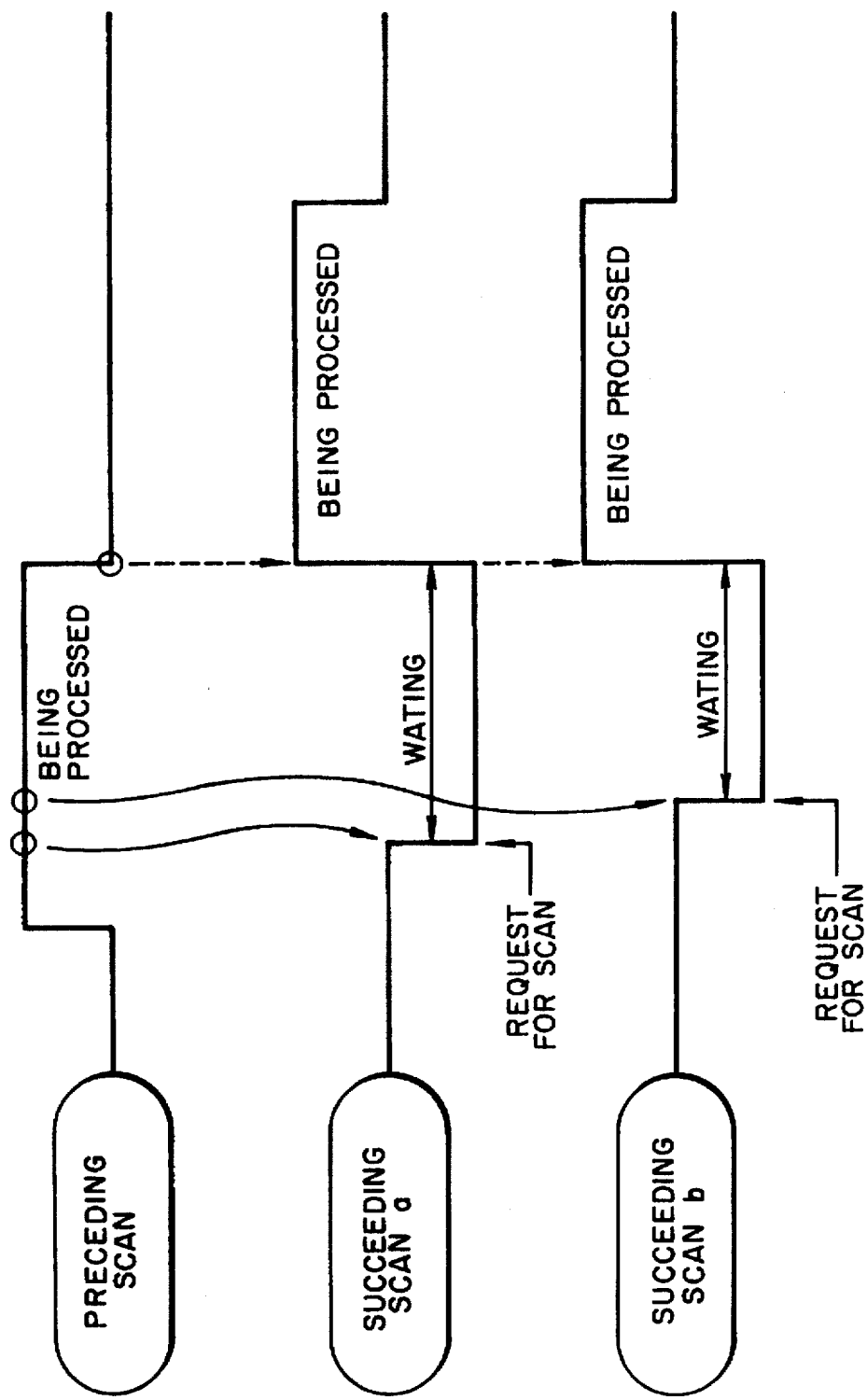
FIG. 5 is a time chart showing how a scan is executed by temporarily holding plural physical sequential scans.

FIG. 5 is a time chart showing how the succeeding requests a and b for the physical sequential scan are temporarily kept waiting and then are executed as a batch when the preceding request is completed. If the succeeding processes a and b for scan are requested while the other process for scan is being executed, these processes a and b are kept in the waiting state. Then, after the preceding process for scan is completed, the processes a and b are executed. Though the preceding process and the succeeding two processes, that is, three scanning processes are executed, the data is read from the external storage unit 103 to the database buffer just twice. This means the accessing efficiency is improved. Further, a response speed to each request for physical sequential scan is improved as well. In this case, as more succeeding requests for the physical sequential scan are given, the utilization efficiency of the database buffer 109 is more improved.

[Embodiment 2]

Figure 6:
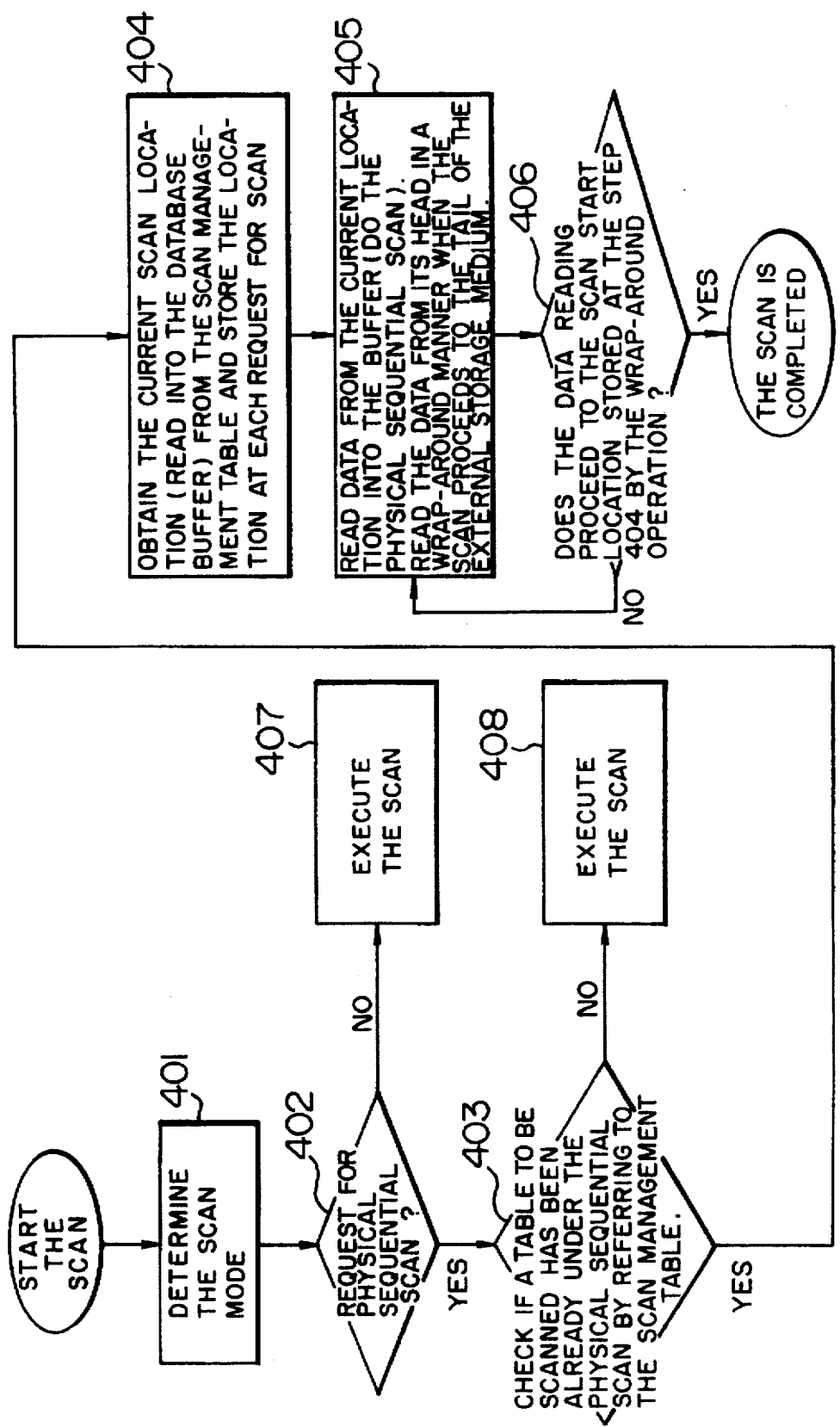
FIG. 6 is a flowchart showing a process of using the read data from a halfway point of the data read by another scanning process.
Figure 8:
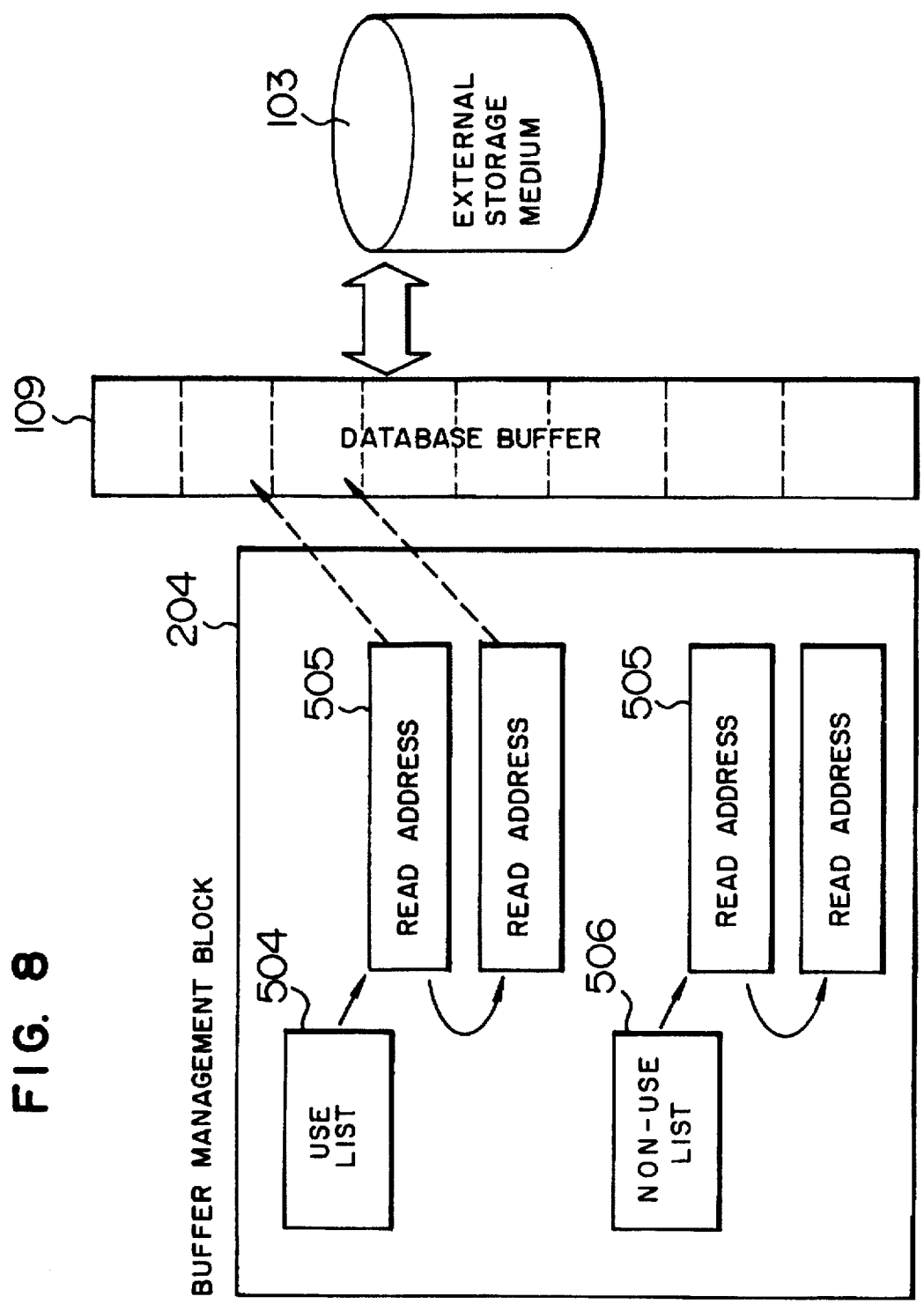
FIG. 8 is a block diagram showing a buffer management block 204 shown in FIG. 2 in detail.

In turn, the description will be oriented to an improved embodiment arranged to speed up the process. FIG. 6 is a flowchart showing the operation executed by the start location storage type improvement. The arrangement of the system is identical to that as shown in FIGS. 1 and 2. As shown in FIG. 8, the buffer management block 204 provides a use list table 504 and a non-use list table 506 for managing the used buffer areas of the database buffer 109. These tables 504 and 506 store a read address 505 of the data read into each buffer area.

At first, when a request for scan is input, the operation is executed to determine whether or not the physical sequential scan is to be done. This determination is based on whether or not any index is provided for the scan or if it does, whether or not a high hit rate is proper by referring to the statistics about the past scan processes. If the bit rate is too high, the index is not efficient for the scan.(step 401)

If the request is not for the physical sequential scan, the requested type of scan is executed (steps 402 and 407).

If it is determined that the physical sequential scan is to be done, the operation is executed to check the scan management table 203 for obtaining information about whether or not a physical sequential scan has been already in operation (step 403). In other words, the information to be obtained is about whether or not the table to be scanned by the current request has been already registered in the scan management table 203.

If no physical sequential scan is now under execution, the request for scan is executed (steps 403 and 408).

If, however, the physical sequential scan for the target database (table) is now under execution by another request, the operation is executed to obtain page information 203b being currently scanned from the scan management table 203, store the page information at a scan start location 202c of the table access management block 202 in each requested area (step 404), read data from a storage location of the data buffer 109 indicated by the page information, and execute the physical sequential scan for the data (step 405).

In this case, when the reading operation reaches the end of the data in the external storage unit 103, the reading operation returns to the head of the data as in a wrap-round manner. This wrap-round reading process proceeds up to the scan start location of the succeeding scan process stored at the step 404 (step 406).

As set forth above, the system according to the improved embodiment operates to scan the data existing after the halfway location at which another process for scan now reads the data without having to read the overall data from its head in the external storage unit 103. With this operation, the data read into the database buffer 109 by the preceding request is allowed to be re-used for the succeeding requests for physical sequential scan. This makes it possible to reduce the times of reading the data into the database 109 and enhance response speed for each request for scan. Further, as compared with the previous embodiment where the succeeding requests are kept waiting, the present system may obtain a scanned result faster by an amount of the waiting time, because the system needs no waiting time unlike the previous embodiment.

Figure 7:
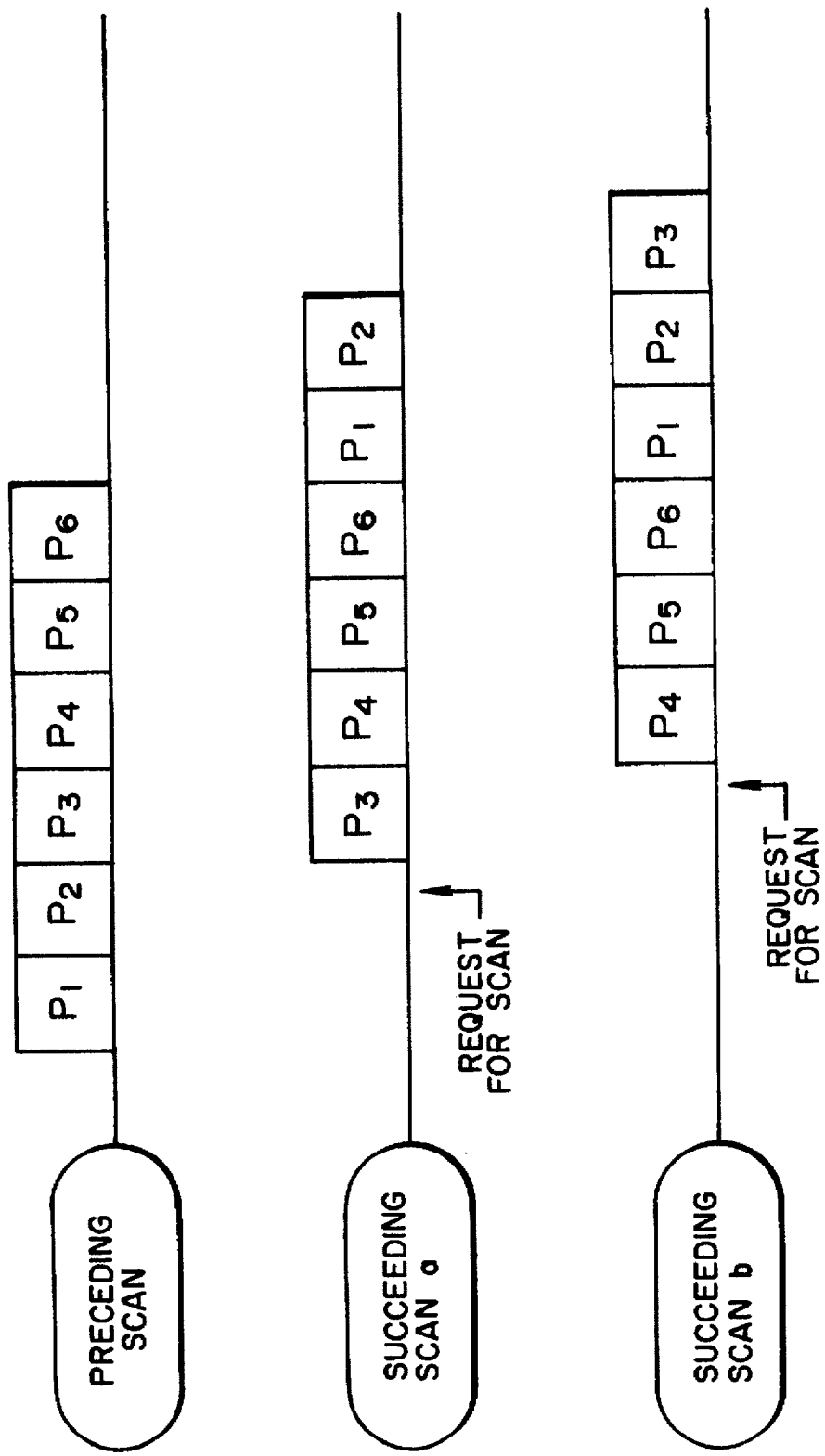
FIG. 7 is a time chart showing how to use the read data from the halfway point of the data read by another scanning process to the last.

FIG. 7 is a time chart showing how the succeeding request for physical sequential scan uses the data P3 to P6 scanned by the Preceding process, another request b for physical sequential scan uses the data P4 to P6 scanned by the preceding process, and the short data P1 to P2 and P1 to P3 are read in a wrap-round manner. Assume that the database is divided by pages each of which corresponds to one reading operation of the data into the database buffer 109. If the database is divided into P1 to P6 and the succeeding process a for scan is issued when the preceding process is scanning over the block P2, the succeeding process a starts to scan the data from the next block P3. Likewise, if the succeeding process b for scan is issued when the preceding process is scanning over the block P3, the succeeding process b starts to scan the data from the same block P3. And, if the data of each block is read from the external storage unit 103 to the database buffer 109, the read data is used for executing the preceding scan process and the succeeding scan processes a and b.

The operation of reading data into the database buffer 109 will be discussed with reference to FIG. 9. FIG. 9 is a flowchart showing the process for reading data into the database buffer 109.

When the data is read into the database buffer 109 for the physical sequential scan, the operation is executed to find out an empty buffer area from the use list table 504 in the buffer management block 204 (step 601). If no empty area is found, the operation is executed to release the buffer area corresponding to the oldest page from "the pages being now accessed" not excluded for "reference" and stored in the scan management table 203 (steps 602 and 603).

If an empty area is found, the data is read into the empty area (step 604).

After the reading is completed, the operation is executed to update an access page 203b of a table title 203a read into the scan management table 203, give an exclusive use of "reference" until the use of the data is completed (step 606), release the exclusive reference after the data use is completed, and then terminate reading of one page (steps 607 and 608).

In order to update the data stored in the external storage unit, it is necessary to provide another buffer (not shown) rather than the database buffer 109 used for the physical sequential scan. By using the buffer, the update is executed under the control of the buffer update control section 503.

In addition, the system according to the foregoing embodiment may apply to any type of database. The system is used for the physical sequential scan of various types of databases such as a table type database, a relational database, and an object oriented database.

As set forth above, the system according to this embodiment is operated as follows. If a preceding request for physical sequential scan is issued before plural requests for such scan, the succeeding requests are kept waiting until the physical sequential scan is completed. After the scan is completed, these succeeding requests are executed. If these plural requests for scan reach the system at respective times, the scans are started at a time when the preceding requested scan is completed. The succeeding requests for scan use one database buffer for doing the physical sequential scan.

This operation results in reducing the times of reading the data from the external storage unit and the reading time of length (seek/search time), thereby effectively improving a response speed against each request for scan.

Further, for each request for scan, the data existing after the halfway location at which the preceding scan process now reads the data is used for the scan, without having to read the data from its head in the external storage unit. The data read into the database buffer by the preceding request for scan is allowed to be re-used by the succeeding requests for scan. This makes it possible to reduce the times of reading the data from the external storage unit, and enhance a response speed for each request for scan. Further, as compared with the previous embodiment where the succeeding requests are kept waiting, the present system may obtain a scanned result faster by the amount of the waiting time, because the system needs no waiting time unlike the previous embodiment.

[Embodiment 3]

Next, the description will be oriented to a system according to a third embodiment of the invention. This system provides a faster processing capability than the system of the second embodiment.

In the first and the second embodiments, the database buffer 109 inside of the processing device 102 provides a smaller storage capacitance than the external storage unit 103, so that the data read from the external storage unit 103 to the database buffer 109 is discarded if the buffer is full of the used data. To re-use the same data for another scan, it is necessary to read the same data from the external storage unit 103 again. Hence, if the physical sequential scan frequently takes place in the database system, the data is read from the external storage unit at each scan. This operation results in increasing a frequency of reading data from the external storage unit and greatly lowering a scan throughput. To overcome this shortcoming, the database system having plural processing devices operating concurrently operates to transfer the data to the database buffer of another processing device if the data meets a predetermined condition and reads the data from a target database buffer if the data is required to be read again.

Now, the system of the third embodiment will be discussed with reference to FIGS. 10 to 12.

Figure 10:
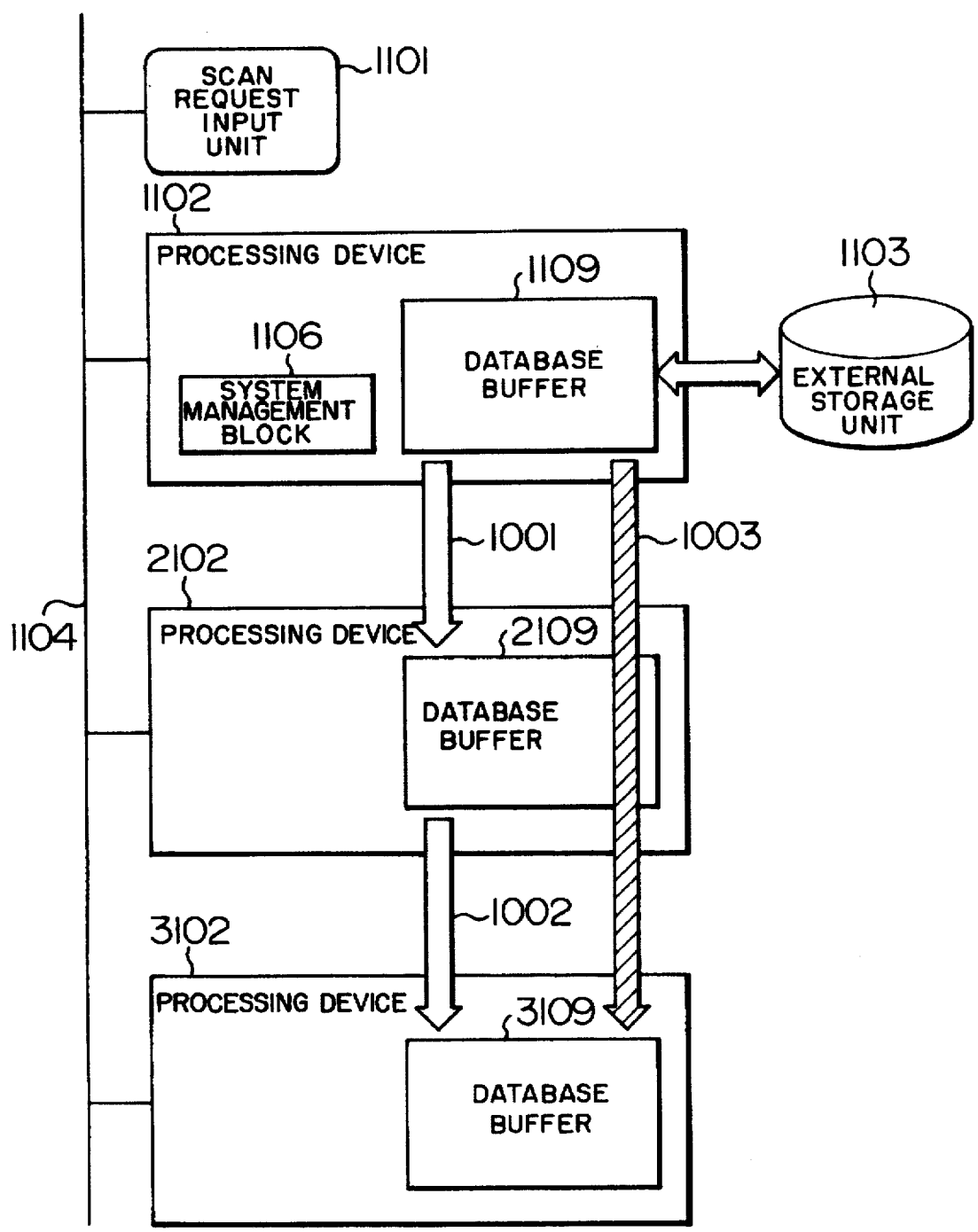
FIG. 10 is a block diagram showing an overall arrangement of a system according to a third embodiment of the invention.

FIG. 10 is a block diagram showing the overall arrangement of the system according to the third embodiment of the invention. As shown, three processing devices 1102, 2102 and 3102, which are operative in parallel, are connected with one another through an inter-processor high-speed communication path 1104. Each of these processing devices has the same arrangement as the processing device 102 shown in FIG. 1. (Some components are not described in FIG. 10.) A system management block 1106 operates to record and manage the data as described with respect to FIG. 2 and address information about what kind of data is held in a database buffer of each processing device. A scan request input unit 1101 or an external storage unit 1103 such as a magnetic disk unit with a large volume has the same arrangement as the scan request input unit 101 or the external storage unit 103 as shown in FIG. 1. In FIG. 10, no external storage unit is connected to the processing device 2102 or 3102. The external storage unit may be connected to the processing device 2102 or 3102.

Figure 11:
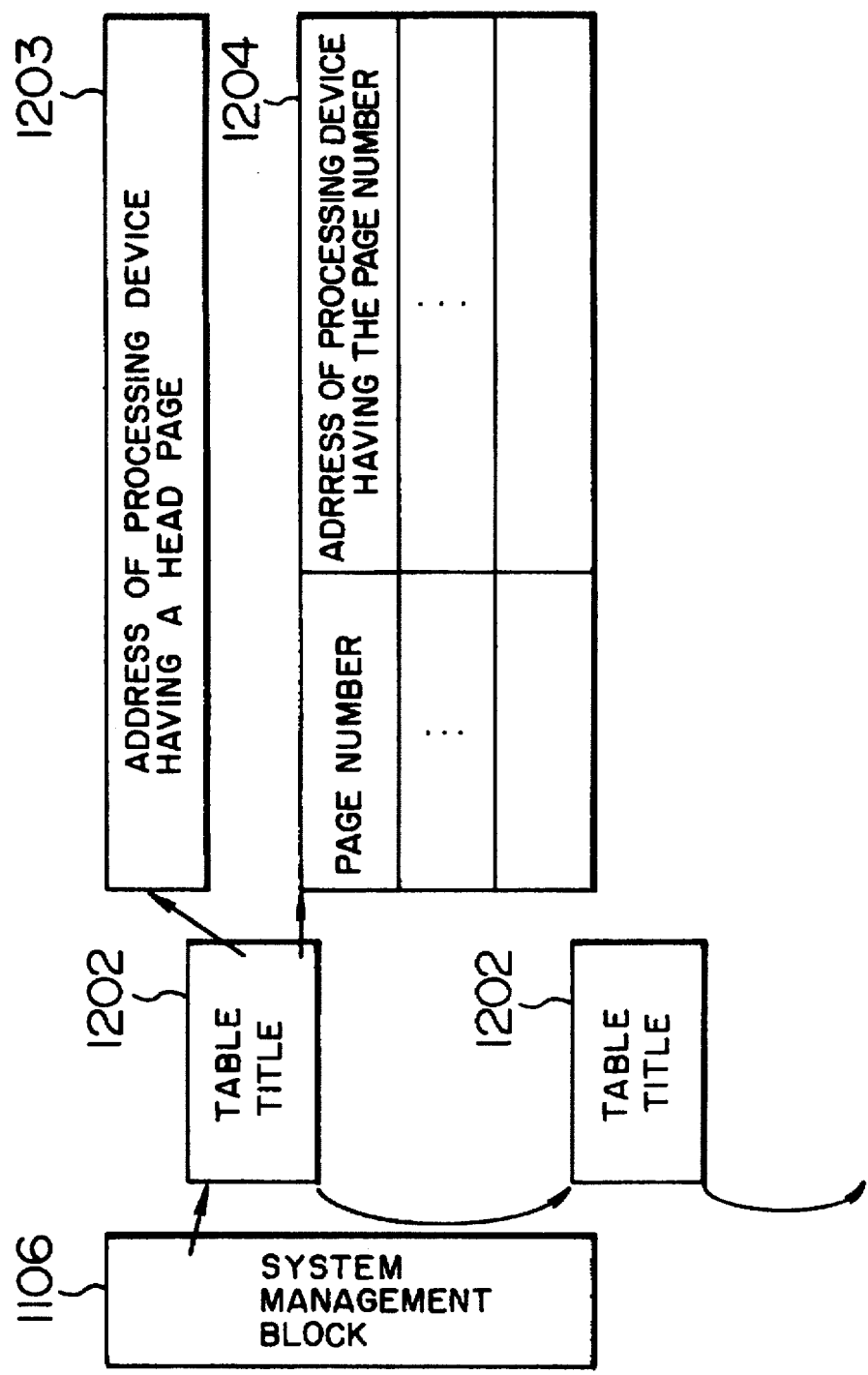
FIG. 11 is a diagram showing a detail of a system management block 1106 shown in FIG. 10.

FIG. 11 shows the content of the data contained in the system management block 1106. A table title index 1202 managed by the system management block 1106 provides a head page address 1203 and a general page address 1204 for each table. The head page address 1203 is used for specifying the processing device 2102 having a data buffer 2109 for holding the head page. The general page address 1204 is used for specifying the processing device 3102 having a data buffer for holding the other pages.

Figure 12:
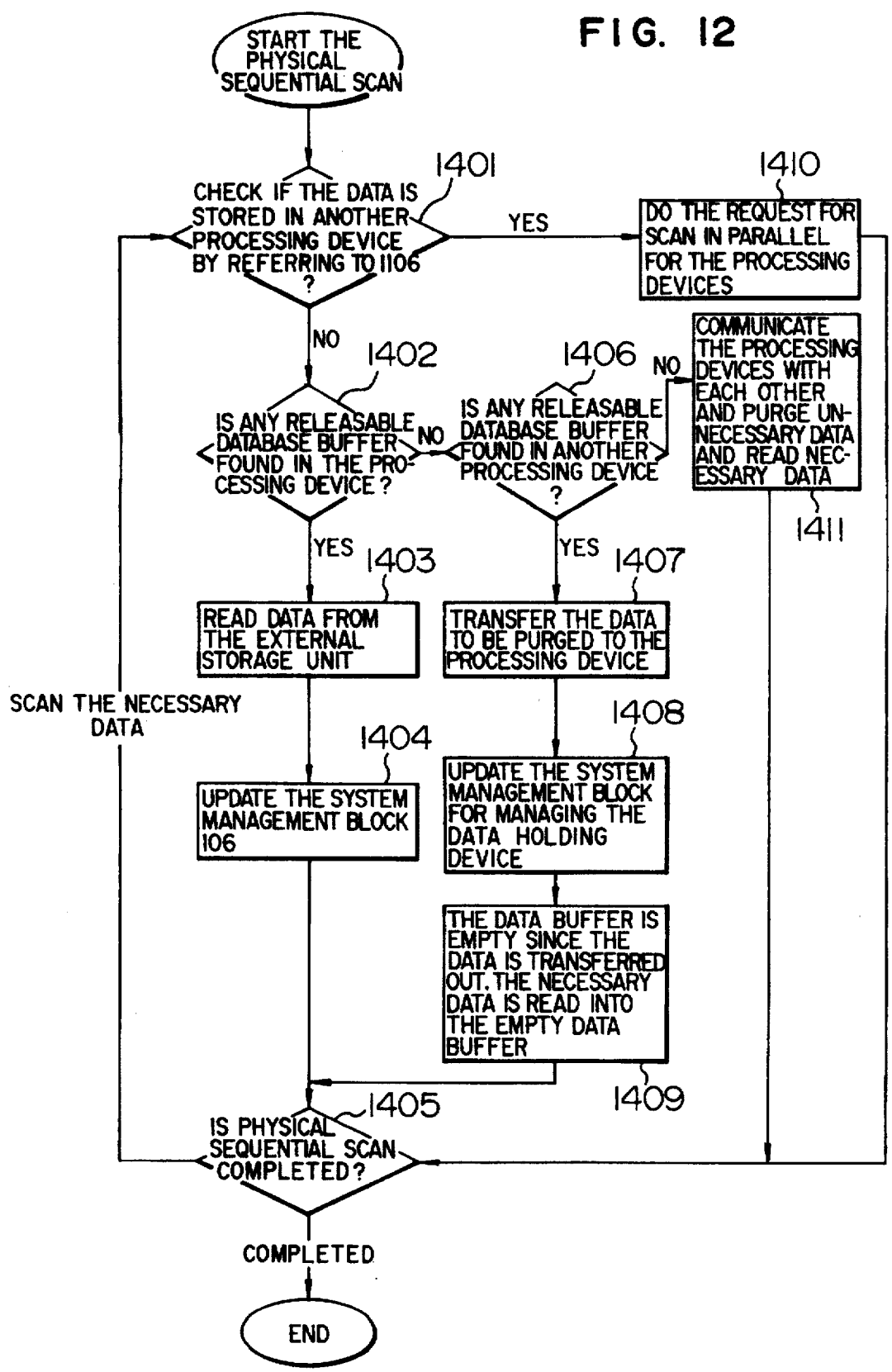
FIG. 12 is a flowchart showing a process executed in the third embodiment of the invention.

FIG. 12 is a flowchart showing a flow of process executed in the system according to the third embodiment. In order to do the physical sequential scan, the operation is executed to check the content recorded in the system management block 1106 and specify which of the processing devices 2102 and 3102 stores desired data (step 1401). If any one of the processing devices contains desired data, the operation is branched to a step 1410 at which a request for scan is concurrently issued to all the specified processing devices for doing the physical sequential scan. On the other hand, if no desired data is stored in both of the processing devices 2102 and 3102, the operation is branched to a step 1402 at which it is determined whether or not a releasable database buffer 1109 is in the processing device 1102 connected to the external storage unit. (A "releasable data buffer" means, as an example, a database buffer area for storing data of another table not referenced by any scan process being now executed.) If the releasable database buffer 1109 is found at the step 1402, the desired data is read from the external storage unit to that database buffer 1109 (step 1403) and the system management block 1106 is updated (step 1404). Further, if no releasable database buffer 1109 is found at the step 1402 (that is, the database buffer 1109 is full), the operation is branched to a step 1406. At this step, the operation is executed to find the releasable data buffers 2109 and 3109 in the other floating (non-use) processing devices 2102 and 3102. Then, the used data is purged to the data buffer in the other processing device (step 1407), and the system management block 1106 is updated (step 1408). As a purging means, there have been considered two ways, that is, a method for sequentially purging data from the database buffer 1109 to the database buffer 2109 and from the database buffers 2109 to 3109 (routes 1001 and 1002 shown in FIG. 10) and a method for directly transferring data from the database buffer 1109 to any database buffer 3109 (a route 1003 shown in FIG. 10). Then, the desired data is read into the data buffer 1109 of the processing device 1102 connected to the external storage unit from which all the data is purged out (step 1409).

As set forth above, if the database buffer is in overflown, at regular intervals or at each constant accessed data, the used page is transferred and the data is allowed to be re-used. That is, for twice or more data scans for the same data, without reading the data from the external storage unit having a slow access speed (about 1 MB/sec), the scan is directly executed for the data stored in the data buffer having a fast access speed (about 100 MB/sec). In particular, this operation is effective in reducing a frequency of reading data from the external storage unit if the physical sequential scan often takes place, thereby improving a scanning throughput. In addition, it is also effective in executing another physical sequential scan for the same data in parallel, thereby further improving a throughput of a scan process.

Further, the system of the third embodiment operates to issue a request for scan to another processing device at the step 1410. In place, without having to do a distributed scan process, the request for scan may be transferred from another processing device to the database buffer of the original processing device for executing the request for scan.

What is claimed is:

1. A scanning method executed in a database processing device for concurrently executing plural scan processes for one database, comprising the steps of:
    determining whether or not a preceding physical sequential scan is being executed for said database if a request for physical sequential scan is issued to said database;
    if said preceding scan is being executed, keeping the succeeding request for physical sequential scan in a waiting state until said preceding scan is completed; and
    executing the succeeding request for physical sequential scan after said preceding scan is completed.

2. A scanning method as claimed in claim 1, wherein if the succeeding plural requests for physical sequential scan are awaited, those requested scans are started at a time after said preceding requested scan is completed.

3. A scanning method as claimed in claim 2, wherein said database processing device provides buffer memories for temporarily storing data read out of said database, sand data is used for said scan, and said plural physical sequential scans are executed by using said buffer memories for storing corresponding data units in said database.

4. A scanning method as claimed in claim 3, wherein said scan process is a collating process without changing the change of said database.

5. A scanning method as claimed in claim 3, executed in plural database processing devices connected through a communication line, comprising the steps of:
    checking for an empty area in a buffer memory of another database processing device if stored data is discarded from said buffer memory;
    transferring said data to be discarded to said empty area if any; and
    giving a request for scan to one of said database processing device for holding said data if said data discarded from the original database processing device is requested to be re-scanned.

6. A scanning method for executing plural scans for one database in a database processing device arranged to temporarily store each predetermined data unit from said database to a buffer memory and execute said scan by using said stored data, comprising the steps of:
    determining whether or not a preceding physical sequential scan is now being executed for said database if a physical sequential scan for said database takes place;
    storing a location of said database being processed in said scan process under execution if any;
    starting the succeeding scan process from said stored location in parallel to said preceding physical sequential scan; and
    executing said succeeding scan process for said database from its head to said stored location after said preceding physical sequential scan is completed.

7. A scanning method as claimed in claim 6, wherein said scan process is a retrieving process with no change of said database.

8. A scanning method as claimed in claim 6, executed in plural database processing devices connected with one another through a communication line, further comprising the steps of:
    checking for an empty area of said buffer memory of another database processing device if said stored data is discarded from said buffer memory; and
    if said empty area is found, transferring said data to be discarded to said empty area.

9. A scanning method as claimed in claim 8, wherein if said data discarded from the original database processing device is requested to be rescanned, a request for scan is issued to a database processing device for holding said data.

10. A scanning method as claimed in claim 8, wherein if said data discarded from the original database processing device is requested to be rescanned, said data is transferred from a database processing device for holding said data to said buffer memory of the original database processing device.

11. A scanning method executed in a database system having database processing devices arranged to store each predetermined unit data from a database to the corresponding buffer memories and perform the scan for said stored data and a communication line for connecting said database processing devices, comprising the steps of:

in any one of said database processing devices, if a request for scanning said database is issued, checking whether or not the target data stays in the buffer memory of another database processing device;

if the target data stays in said buffer memory, issuing an execution instruction for scanning said database to another database processing device; and if no target data stays in said buffer memory, reading each predetermined data unit from said database to said buffer memory of another database processing device and executing said scan process.

12. A scanning method executed in a database system having database processing devices arranged to read each predetermined data unit from a database to the corresponding buffer memories and perform a scan process for said read data and a communication line for connecting said database processing devices, comprising the steps of:

in any one of said database processing devices, if a request for scanning said database takes place, checking whether or not target data stays in the buffer memory of another database processing device;

if said target data stays in said buffer memory, transferring said data to said buffer memory of another database processing device and executing a scan process for said data; and if no target data stays in said buffer memory, reading each predetermined data unit from said database to said buffer memory and executing a scan process for said data.

13. A scanning method executed in a database system having a plurality of database processing devices and a communication line for connecting the database processing devices, a database being stored in an external storage, the external storage being connected with one of the database processing devices and each of the database processing devices having a buffer memory, a scan processing being performed on the buffer memory to which a predetermined unit of data is read from the database, comprising the steps of:

in the one database processing device, (a) if a scan request for the database is issued, checking whether or not the target data is in the buffer memories of all database processing devices;

(b) if the target data is in the buffer memory of another database processing device, issuing a scan instruction to the another database processing device;

(c) if no target data is in any of the buffer memories of all of the database processing devices;

(c1) checking whether or not any free area having the predetermined unit size is in the buffer memory of the one database processing device;

(c2) if no free area is in the buffer memory of the one database processing device, moving the content of area of its buffer memory to the buffer memory of one of the other database processing devices to make free area; and (c3) reading the data from the database to the free area in the buffer memory of the one database processing device; and (d) executing a scan process on the buffer memory storing the target data.

14. A scanning method executed in a database system having a plurality of database processing devices and a communication line for connecting the database processing devices, a database being stored in an external storage, the external storage being connected with one of the database processing devices and each of the database processing device having a buffer memory, a scan processing being performed on the buffer memory to which a predetermined unit data is read from the database, comprising the steps of:

in the one database processing device, (a) if a scan request for the database is issued, checking whether or not the target data is in the buffer memories of all of the database processing devices;

(b) if the target data is in the buffer memory of another database processing device, transferring the target data from the another database processing device to the buffer memory of the one database processing device;

(c) if no target data is in the buffer memories of all of the database processing devices;

(c1) checking whether or not any free area having the predetermined unit size is in the buffer memory of the one database processing device;

(c2) if no free area is in the buffer memory of the one database processing device, moving the content of area of the buffer memory of the one database processing device to the buffer memory of one of the other of the database processing devices to make a free area; and (c3) reading the data from the database to the free area in the buffer memory of the one database processing device; and (d) executing a scan process on the buffer memory storing the target data.

* * * * *